United States Patent
Fuehrer et al.

(10) Patent No.: US 7,107,473 B2
(45) Date of Patent: Sep. 12, 2006

(54) METHOD AND DEVICE FOR SYNCHRONIZING THE GLOBAL TIME OF A PLURALITY OF TTCAN BUSES AND A CORRESPONDING BUS SYSTEM

(75) Inventors: Thomas Fuehrer, Gerlingen (DE); Bernd Mueller, Leonberg (DE); Florian Hartwich, Reutlingen (DE); Robert Hugel, Karlsruhe (DE)

(73) Assignee: Robert Bosch GmbH, Stuttgart (DE)

( * ) Notice: Subject to any disclaimer, the term of this patent is extended or adjusted under 35 U.S.C. 154(b) by 165 days.

(21) Appl. No.: 10/472,098

(22) PCT Filed: Mar. 14, 2002

(86) PCT No.: PCT/DE02/00916

§ 371 (c)(1),
(2), (4) Date: Mar. 22, 2004

(87) PCT Pub. No.: WO02/075562

PCT Pub. Date: Sep. 26, 2002

(65) Prior Publication Data

US 2004/0148537 A1    Jul. 29, 2004

(30) Foreign Application Priority Data

Mar. 15, 2001 (DE) .............................. 101 12 910
Mar. 15, 2001 (DE) .............................. 101 12 912
Mar. 15, 2001 (DE) .............................. 101 12 913

(51) Int. Cl.
*G06F 13/42* (2006.01)
(52) U.S. Cl. ..................... 713/400; 713/600
(58) Field of Classification Search ................ 713/400, 713/600
See application file for complete search history.

(56) References Cited

U.S. PATENT DOCUMENTS

| 5,838,995 | A |  | 11/1998 | Neal et al. |
| 5,991,844 | A |  | 11/1999 | Khosrowpour |
| 6,092,210 | A |  | 7/2000 | Swindle et al. |
| 6,914,895 | B1 | * | 7/2005 | Straub et al. ............... 370/350 |
| 6,975,654 | B1 | * | 12/2005 | Domon ........................ 370/509 |

FOREIGN PATENT DOCUMENTS

DE    195 09 558    9/1996

(Continued)

OTHER PUBLICATIONS

Banerjee et al., *A Time Driven Controller Area Network for Reliable Automation*, Indian Journal of Power and River Valley Development, Books and Journals Private, Ltd., IN, vol. 47, No. 1 / 2, Jan. 1997, pp. 6-8.

(Continued)

*Primary Examiner*—Thomas C. Lee
*Assistant Examiner*—Erin Dogan
(74) *Attorney, Agent, or Firm*—Kenyon & Kenyon LLP (57) ABSTRACT

A method, a device, and a bus system for synchronizing at least two TTCAN buses having at least one bus user, a global time being determined in each TTCAN bus, and the deviations in the global times of the TTCAN buses being determined from the global times, the TTCAN buses being connected via at least one user and the deviations in the individual global times being transmitted to at least one bus user, and the global times of the TTCAN buses connected via at least one user being adjusted to one another as a function of the deviations in the global times, so that the TTCAN buses are synchronized with respect to the global times.

10 Claims, 3 Drawing Sheets

FOREIGN PATENT DOCUMENTS

| | | |
|---|---|---|
| DE | 100 00 302 | 7/2001 |
| DE | 100 00 303 | 7/2001 |
| DE | 100 00 304 | 7/2001 |
| DE | 100 00 305 | 7/2001 |
| WO | 00 07335 | 2/2000 |

OTHER PUBLICATIONS

Fuehrer et al., *Time Triggered Communication on CAN (Time Triggered CAN—TTCAN)*, Proc. of the International CAN Conference, 2000, pp. 1-7.

* cited by examiner

METHOD AND DEVICE FOR SYNCHRONIZING THE GLOBAL TIME OF A PLURALITY OF TTCAN BUSES AND A CORRESPONDING BUS SYSTEM

FIELD OF THE INVENTION

The present invention relates to a method and a device for synchronizing the global time in at least two TTCAN buses, as well as to a corresponding bus system.

BACKGROUND INFORMATION

In recent years, there has been a drastic increase in the networking of control units, sensors, and actuators by a communication system, i.e. by a bus system, in the manufacturing of modem motor vehicles and machine construction, in particular in both the machine tool sector and automation. Synergistic effects may be achieved here due to the distribution of functions among a plurality of control units. These are known as distributed systems. Communication between different stations is increasingly being accomplished via at least one bus or at least one bus system. Communication traffic on the bus system and the access and reception mechanisms, as well as error handling, are regulated by a protocol.

The CAN (controller area network) protocol is well established in the automotive sector. This is an event-driven protocol, i.e. protocol activities such as sending a message are initiated by events which have their origin outside the communications system. Unique access to the communication system or bus system, is triggered via priority-based bit arbitration. A prerequisite for this is that a priority is assigned to each message. The CAN protocol is very flexible. It is, thus, readily possible to add additional nodes and messages as long as there are still free priorities (message identifiers). The collection of all messages to be sent in the network, together with their priorities and transmitter nodes, plus possible reception nodes, are stored in a list known as the communication matrix.

An alternative approach to event-driven, spontaneous communication is the purely time-triggered approach. All communication activities on the bus are strictly periodic. Protocol activities such as sending a message are triggered only by the advance of a time valid for the entire bus system. Access to the medium is based on the apportionment of time periods during which a transmitter has an exclusive transmission right. The protocol is comparatively inflexible; new nodes may only be added if the corresponding time ranges have already been freed up in advance. This circumstance requires that the order of messages already be determined before starting operation. Thus, a timetable is drawn up which has to meet the requirements of the message with respect to rate of repetition, redundancy, deadlines, etc. One speaks of a so-called bus schedule. The positioning of messages within the transmission periods must be coordinated with the applications which produce the message content to minimize the latency between the application and the transmission time. If this matching does not take place, the advantage of the time-controlled transmission (minimal latent jitter when sending the message on the bus) is destroyed. Thus, high demands are made on the planning tools. TTP/C is such a bus system.

The requirements outlined above for a time-triggered communication and the requirements for a certain measure of flexibility are met by the method of time-triggered CAN known as TTCAN (time-triggered controller area network), which is described in German Published Patent Application No. 100 00 302, German Published Patent Application No. 100 00 303, German Published Patent Application No. 100 00 304 and German Published Patent Application No. 100 00 305, as well as in ISO Standard 11898-4 (currently in the form of a draft). TTCAN meets these requirements by establishing the communication cycle (basic cycle) in so-called exclusive time windows for periodic messages of certain communication users, and in so-called arbitrating time windows for spontaneous messages of a plurality of communication users. TTCAN is essentially based on a time-triggered, periodic communication, which is clocked by a user or node, which gives the operating time and is known as the time master, with the help of a time reference message, or, for short, reference message. The period until the next reference message is known as the basic cycle and is subdivided into a predefinable number of time windows. In this context, a distinction is made between the local times, i.e. local timers of the individual users, i.e. nodes, and the time of the time master as the global time of its timer. Additional principles and definitions based on TTCAN are given in the ISO Draft 11898-4 or the mentioned related art and are thus assumed to be known and will not be explicitly described again.

Thus, there are numerous real time bus systems for networking control units in automation, in motor vehicles or elsewhere, including the aforementioned CAN, TTP/C or Byteflight, as well as the TTCAN just mentioned. CAN, TTCAN and Byteflight are single-channel bus systems, which means that redundancy may be achieved by duplicating the corresponding system. TTP/C is intrinsically a two-channel system, i.e. the redundancy is always built in. Many bus systems offer a time base synchronized with the bus as a service. In the bus systems designed from the start as two-channel or multichannel solutions, the synchronization per design is typically forced in that a node or user must simultaneously transmit on the two buses. This has advantages (e.g. synchronization is always ensured), but it also has a number of disadvantages, such as the fact that not every bus may be operated by itself, the time patterns on the two buses may only differ to a very limited extent, and the modularity of the two or more bus systems is weakened due to the coupling which is provided by design.

As explained, it is obvious that the related art is incapable of yielding optimum results in every respect. This situation is to be improved in the following.

In the case of buses or bus systems designed as single-channel systems, synchronization is performed explicitly if needed. In the following, a TTCAN network is assumed to be a bus system, or it is assumed that there are a plurality of TTCAN buses or bus systems, and that they are coupled, but this is only to be understood as restrictive with regard to the object of the present invention to be explained later, inasmuch as the properties of the TTCAN are a prerequisite or necessity for representing the object according to the present invention.

SUMMARY OF THE INVENTION

The present invention relates to a method, a device, and a bus system for synchronizing at least two TTCAN buses having at least one bus user, a global time being determined in each TTCAN bus, and the deviations in the global times of the TTCAN buses being determined from the global times, these buses being interconnected via at least one user, and the deviations in the individual global times being transmitted to at least one bus user, and the global times of the TTCAN buses connected via at least one user being adjusted to one another as a function of the deviations in the global times, so that the buses are synchronized with respect to the global times.

The global times of the TTCAN buses connected by at least one user are advantageously adjusted by adjusting the phase of the global time.

The global times of the TTCAN buses connected by at least one user are expediently adjusted by adjusting the frequency of the global time.

In an advantageous embodiment, the phase of the global time is adjusted as a function of the value of at least one predefined bit.

It is also advantageous that the at least one predefined bit corresponds to the discontinuity bit of the TTCAN.

A smallest time unit (NTU) in the at least two TTCAN buses to be synchronized is advantageously determined for adjusting the frequency to the global time, and the ratio of these smallest time units is determined and the resulting real ratio is compared to a predefined ratio, at least one smallest time unit being adjusted so that the predefined ratio is achieved.

In addition, it is advantageous that the predefined ratio corresponds to an integer, in particular a multiple or submultiple of the number two.

DETAILED DESCRIPTION

The present invention describes general possibilities for how a fault-tolerant bus system or network may be created from a combination of several TTCAN buses. This is particularly advantageous in conjunction with the mechanisms with regard to synchronization of the global time of a plurality of TTCAN buses and/or synchronization of the cycle time of a plurality of TTCAN buses, so that mutual synchronization of all these buses in the entire bus system or network may be accomplished.

Figure 1:
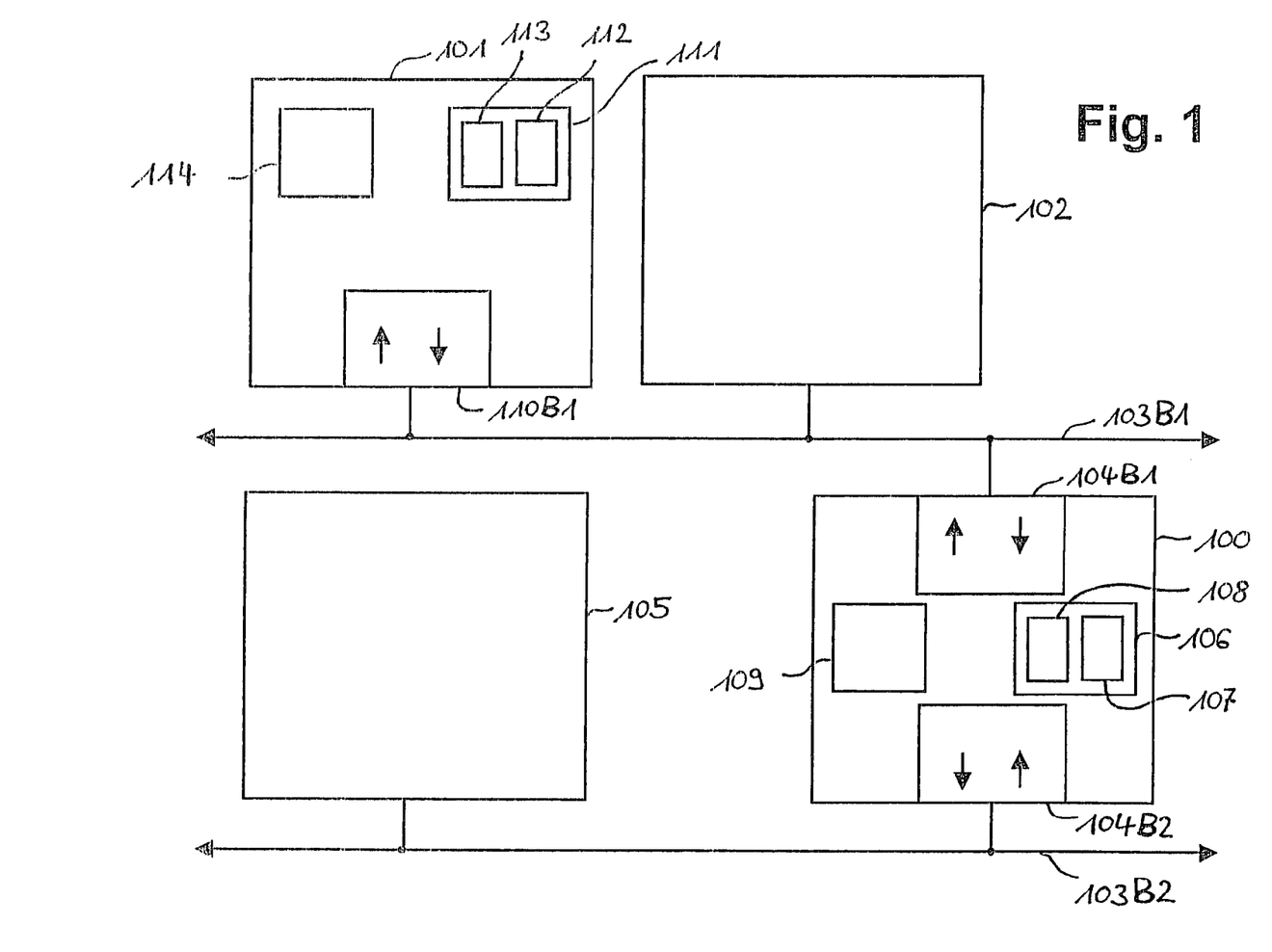
FIG. 1 shows the coupling of two TTCAN bus systems by a user which functions as a gateway user.

FIG. 1 shows a bus system or network made up of a plurality of TTCAN buses or TTCAN bus systems, in this case two. A first bus is represented by 103B1, and a second bus is represented by 103B2. Two users 101 and 102 are connected to the first bus 103B1. A user 105 is connected to second bus 103B2. User 100 is connected to both buses 103B1 and 103B2 and functions as a connection user or gateway computer, i.e. gateway user, or also a gateway controller which has access to the two buses. A coupled pair of TTCAN buses (103B1 and 103B2 here) is thus defined as a combination of two TTCAN buses, such that there is at least one gateway user having access to both buses. The connection of the individual users to the particular bus is accomplished via a corresponding interface element, e.g. interface element 110B1 in the case of user 101. Likewise, user 100 is connected as a gateway user to bus 103B1 via an interface element 104B1, and to bus 103B2 via an interface element 104B2. As an alternative, one interface element having two terminals may also be provided for connection to bus 103B1 and to bus 103B2, in contrast with two interface elements 104B1 and 104B2.

Timers 111 and 106 having an internal clock source or time source 107 and 112, in particular a quartz crystal or an oscillator, especially a VCO (voltage controlled oscillator), are also shown in users 100 and 101. In addition, time detection modules, in particular counters 108 and 113, are also contained in timers 106 and 111, respectively.

Control functions in the particular user, in particular for input/output of data to the bus system, for transfer of time information from the timer, and for synchronization of the buses and bus users, as well as other methods and method steps, etc., in particular those according to the present invention, may be performed by modules 109 and/or 114 as processing modules, in particular a microcomputer or microprocessor or controller. Parts of this functionality or the entire functionality may also be provided directly in the particular interface module.

In this context, one user may also be preselected as a time reference generator as defined by TTCAN, in particular per bus system. This user, the time reference generator in the form of a time master, therefore specifies the basic cycle as described in the related art. In the same way, it is possible for the gateway user to function as a time reference generator, i.e. as a time master for the two bus systems. The time generator of the corresponding reference user, i.e. the time master of the particular TTCAN system by which the local time of this time master is determined, is thus considered to be the reference time generator, i.e. it specifies the reference time for the corresponding bus system, i.e. 103B1 and/or 103B2. In other words, the local time generator, e.g. 106 and/or 111 of the specified reference user as the time master, is thus considered a global time generator of the corresponding bus or bus system 103B1 and/or 103B2 and specifies the global time of the corresponding bus.

Therefore, FIG. 1 shows a coupled pair of TTCAN buses having a gateway user or gateway node. For more precise representation of this coupling according to the present invention, the following description according to the present invention is used:

At least two TTCAN buses B1, B2 are coupled when there is a series Pi=(BXi, BYi), where i=1 to n, and there are n elements N having the following properties:

BXi, BYi are TTCAN buses for all i,

For an i, BXi and BYi form a coupled pair of TTCAN buses,

BX(i+1) is BYi (for i=1 to n−1),

BX1 is bus B1 and BYn is bus B2.

In other words, two TTCAN buses B1 and B2 are coupled when they are connected by some path of coupled pairs that is as complex. A system of at least two TTCAN buses is referred to here as a fault-tolerant TTCAN bus system, if two of the buses are coupled (in the sense described above). Therefore, all system architectures using a fault-tolerant TTCAN bus system or network are detectable.

Figure 2:
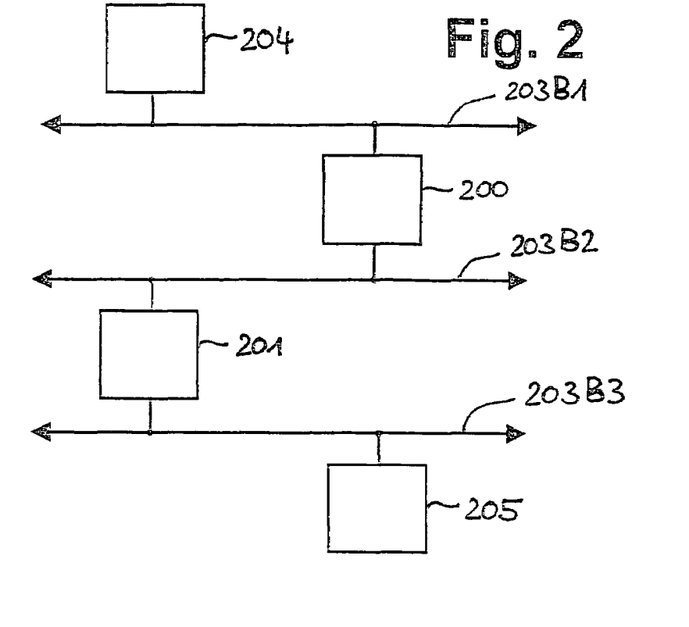
FIG. 2 shows the coupling of three TTCAN bus systems by coupled pairs.
Figure 3:
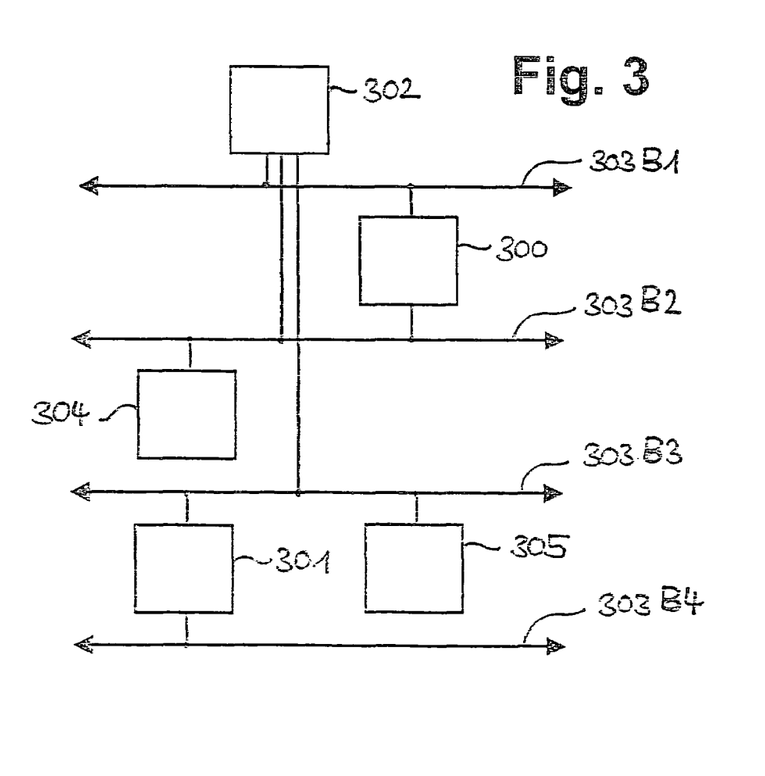
FIG. 3 shows the coupling of four TTCAN bus systems by various users to illustrate scalable tolerance.

Additional examples are shown in FIGS. 2 and 3. FIG. 2 shows three TTCAN buses 203B1, 203B2, and 203B3 as well as bus users 200, 201, 204, and 205. Buses 203B1 and 203B2 are linked together by user 200, and buses 203B2 and 203B3 are linked together by user 201 in the same manner. Thus, in the sense according to the present invention, the coupling of bus systems 203B1 and 203B2 and 203B2 and 203B3 as coupled pairs by users 200 and 201 also allows bus systems 203B1 and 203B3 to be connected in a fault-tolerant manner according to the definition given above, in particular with respect to synchronization. In contrast to conventionally redundant systems, i.e. two buses in the entire bus system, where each node or user is connected in a redundant manner to every other bus, i.e. each user has a connection to each bus, the system architectures proposed here allow a scalable fault tolerance and a mixture of fault-tolerant and non-fault-tolerant systems due to the use of coupled pairs.

This is explained once more, using FIG. 3 as an example. Four buses 303B1, 303B2, 303B3, and 303B4 are shown in it. In addition, bus users 301, 302, 300, 304, and 305 are also shown. Buses 303B1 and 303B2 are linked together by user 300, and buses 303B3 and 303B4 are linked together by user 301. At the same time, three buses 303B1, 303B2, and 303B3 are interconnected by a user 302 so that, on one hand, a mixture of fault-tolerant and non-fault-tolerant systems is made possible, and, on the other hand, the desired fault tolerance in the system is scalable, i.e. it may be represented in various degrees of redundancy (single, double, multiple redundancy). Therefore, it is possible to introduce higher degrees of redundancy into a system, without coupling systems that should remain uncoupled. Consequently, a reduction in common-mode faults, i.e. common-mode faults of the bus system or the bus systems, is likewise possible.

In combination with the synchronization mechanisms in TTCAN, it is thus possible to create a uniform synchronized communication system that permits all conceivable degrees of fault tolerance in the simplest manner. Synchronization is described in greater detail below with respect to the global time as well as the cycle times of individual users or bus systems.

A general method of how two or more TTCAN buses, in particular level 2 buses (see ISO Draft), are able to synchronize their global times with one another will be described first. This method may be used by dedicated hardware, by the applications running on the corresponding host, or by a special software layer.

The method of synchronization, including possible variations in the sequence, is described below. A pair of buses is referred to here as being directly synchronizable, if there is at least one gateway computer having access to both buses, as described above. It is also a general prerequisite that, between two buses to be synchronized, there is a chain of gateways connecting the two buses via directly synchronizable pairs, i.e. the coupled pairs mentioned above. The synchronization layer (hardware or software) performing the synchronization is referred to below as synchronization layer SL. In doing so, the SL need not necessarily be present on each node, as also indicated by the following description.

In one embodiment, the gateway user or gateway computer is the time master in at least one of the two buses to be synchronized, in order to adjust the time in the bus in which it is time master. Optionally, as an additional embodiment, a message may be transmitted from the gateway user to the time master to perform the corresponding time adjustment for the synchronization. Then, it is not necessary for the gateway user to also be time master of at least one of the bus systems to be synchronized.

On each TTCAN bus, the initialization procedure specified for this bus by ISO 11898-4 and the related art for the TTCAN is run through for initialization. As a result, one obtains two or more TTCAN buses, which operate independently of each other and have different global times and different current time masters. In an optional variant, the system design allows one to ensure that the same node or user becomes the time master on both buses or on a plurality of buses.

Figure 4:
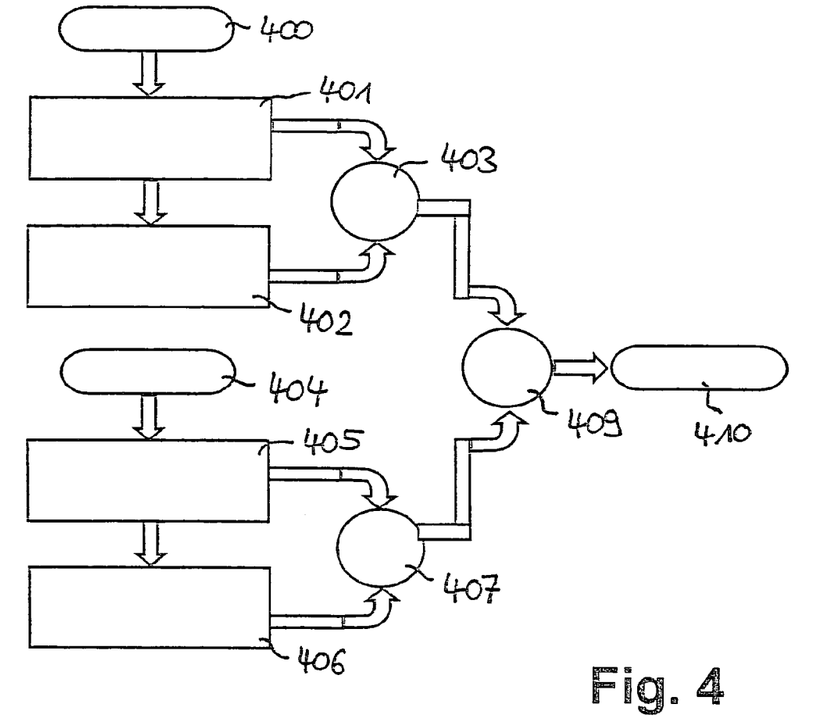
FIG. 4 shows a flow chart of frequency adjustment between two TTCAN buses or TTCAN bus systems.
Figure 5:
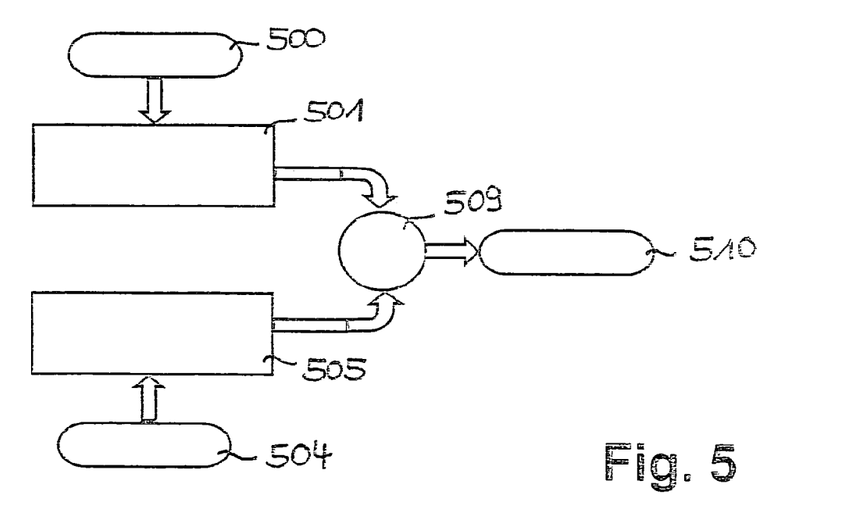
FIG. 5 shows a flow chart to illustrate the phase adjustment of two TTCAN buses or TTCAN bus systems.

Then, on the basis of FIGS. 4 and 5, frequency adjustment and phase adjustment are described, whereby the frequency and the phase of the buses are adjustable independently of one another; in an advantageous embodiment, first the frequency is adjusted because, as long as the frequency is incorrect, i.e. deviates, the phase will be changed continuously.

A) Frequency Adjustment between Two Buses

In the TTCAN, the rate of the global time, i.e. the length of time unit NTU, is determined by the timer frequency of the time master, i.e. in particular the oscillator frequency or quartz crystal frequency and its TUR (time unit ratio) value. In this context, NTU (network time unit) refers to the time units of the global time of the particular bus, and TUR refers to the ratio between the length of an NTU and the length of a specific basic time unit, e.g. the local timer period, i.e. in particular the local oscillator period as described in ISO Draft 11898-4. Synchronization layer SL must ensure that the NTU's on the different buses have the intended ratios to one another. The SL may be represented in hardware or software by processing units 109 and/or 114, etc., but, as mentioned already, the SL need not necessarily be inherent in all users.

In principle, different procedures are conceivable. One bus may be coordinated with the other by selecting the frequency of one bus, i.e. the rate of the global time of the one bus as a setpoint and determining the difference in rate with respect to it, i.e. frequency, of the of the bus; the at least one additional bus being coordinated with the other or the at least two buses approaching each other with respect to the rate of the global time, i.e. in particular the frequency of the timer of the particular time masters. In addition, the adjustment may be performed in one step or gradually. The particular strategy depends on the SL, i.e. the synchronization layer, and the requirements of the particular applications. All methods have the following system in common:

The SL determines the correction to be performed for a bus and transmits it to the current time master. The correction may be, for example, the ratio of the current TUR value and the new TUR value to be set. It is particularly advantageous if the SL determines the correction on the time master, so that the correction value may be the new TUR value directly, for example.

The SL determines the new TUR value in the time master and uses it, starting with the following cycle.

All the other nodes of this bus then follow the time master over the TTCAN synchronization.

To this end, the global time of the first bus, e.g. B1, is determined, e.g. 103B1, in block 400 of FIG. 4. This is determined at a time T1 in block 401, i.e. captured, so that a first capture value of the global time of bus B1 is obtained in block 401. At time T1, a value of the global time of bus B2 determined in block 404, e.g. 103B2, is detected, i.e. captured, in block 405. At subsequent time T2, the first capture value is advanced from block 401 and block 405 to block 402 and block 406, respectively, and a new, second capture value is detected with respect to the global time of the particular bus in block 401 or 405. From these two capture values in block 401 and block 402 and block 405 and block 406, the rate of the global time or the clock rate of busses B1 and B2, respectively, is determined by forming the difference in block 403 and block 407, respectively. Then, by forming the difference in block 409, a correction value is obtained from these values for the rate of the global time of the particular bus, this correction value representing the difference in the rate of the global times of the buses in question, i.e. the difference in the particular clock rate, i.e. the timer rate. As mentioned above, this may also occur or be carried out, e.g. using the specific TUR value. The rest of the method of the present invention then proceeds with the aid of the value, which was determined in block 409 and relates to the frequency adjustment in block 401.

The frequency adjustment is to be illustrated again, using an example. There are two buses, B1 and B2. The synchronization strategy is that B2 must adjust the length of the NTU to the length valid on B1. In the simplest case, it is assumed that both are nominally the same length. The application (SL) of the current time master of B2 is assumed to have direct access to bus B1, and the same timer, i.e. the same clock source or time source, i.e. the same oscillator or quartz crystal, is to be used for B1 and B2. Then, the NTU's of the two buses B1 and B2 are exactly the same length when the TUR value of this node or user with respect to bus B1 is equal to the TUR value of this node and/or user with respect to B2. Therefore, the SL must use the TUR value with respect to B1 as the TUR value with respect to B2.

In principle, the situation may be handled in the same way, if the NTU's of the two buses have any desired ratio to one another. This is then easily implementable in hardware in an advantageous manner, if the ratio or its reciprocal is an integer and, in a particularly advantageous embodiment, a power of two.

If the same timer, i.e. the same time source, is not used for both buses, then there is the possibility of measuring the difference in the global times of the two buses twice or more often, i.e. periodically in succession, and calculating a correction factor from the comparison between the observed change in the difference and the nominal change in the difference. This possibility also exists if the current time master does not have access to the two buses itself. As an alternative, the SL may measure the length of a basic cycle on a bus in units of the other bus and then determine the correction value from it.

B) Phase Adjustment

For the phase adjustment, the SL measures the phase difference between two global times on two buses and determines the jump, i.e. correction value, to be set for each of the two buses. This may be accomplished in an advantageous manner with the aid of the stopwatch register of the TTCAN.

The SL then transmits the jump or correction value to be set to the two current time masters of the two buses. A time master that must set a jump sets a predefined bit, specifically the discontinuity bit in the case of TTCAN, in the next reference message and shifts its global time by the corresponding amount. In this manner, the time reference message, i.e. the reference message, of the corresponding time master is then sent at the adjusted time. After this (these) reference message(s) are successfully transmitted on at least one of the two buses, the at least two buses are synchronized with one another, if necessary.

FIG. 5 shows this phase adjustment. The global times of two buses are ascertained in blocks 500 and 504 and acquired, i.e. captured, in block 501 and block 505. In this context, capturing preferably occurs at the same time T1. The two computer values are now sent directly to a subtractor in block 509 where the phase difference, i.e. the difference in the clock phase, the clock source phase, or the time source phase may be determined based on the simple capture values of the two buses. The rest of the described method according to the present invention is then executed in block 510.

In the case of more than two buses, it is particularly advantageous that, when two buses are synchronized in pairs in such a manner, the jump, i.e. the correction only takes place on one of the two buses, i.e. one of the two buses assumes a master role for the global time. That is, the global time remains unchanged on the first bus, and the global time on the second bus jumps, i.e. is changed. In this case, more than two buses may easily be synchronized successively, using paired synchronization, without this synchronization of a pair having a particularly complex influence on that of another pair.

This is to be illustrated on the basis of an example. There are five buses B1, B2, B3, B4, B5 in the system. The synchronizable, coupled pairs are (B1, B2), (B1, B3), (B2, B4), (B3, B5). If B1 is the master for B2 and B3, B2 is the master for B4, and B3 is the master for B5, then the paired synchronization (B2 and B3 are first synchronized to B1, then B4 is synchronized to B2, and B5 is synchronized to B3) results in system-wide synchronization within two cycles.

In the same system, synchronization could also be performed without the master principle. Then, however, the SL must ensure that the buses synchronized once also remain synchronized, i.e. that a jump or a change on one bus also takes place on all buses synchronized with it.

In addition, it is advantageous (but not necessary) for the time master of a bus to be synchronized to also have direct access to the global time of the corresponding partner bus. In this case, the SL may only be set up for the potential time masters of one bus, i.e. the SL message regarding the level of the jump to be set is eliminated or becomes very simple.

It is not necessary for the NTU's, i.e. the time units of the global time on the buses to be synchronized, to be the same. However, it is particularly simple and useful for the (nominal) NTU's between two coupled buses to only differ by an integral factor (powers of two in a particularly advantageous manner).

C) Phase Adjustment by Frequency Shift

As an alternative to the mechanism described above with respect to the phase adjustment in point B), there is also the possibility of achieving a phase adjustment through a long-term change in rate (see point A in this regard). The procedure is exactly the same in principle as that described in point A) for the frequency adjustment between two buses. In this case, however, the object is not to exactly adjust the NTU of the bus to the target value there, but instead to lengthen or shorten this NTU slightly, so that the clock or timer to be adjusted is incremented somewhat more slowly or rapidly, and thus, a phase adjustment is achieved over a longer period of time.

D) Preserving the Synchronized State

After a phase adjustment as in B) or C), there are various options for retaining the synchronized state. On one hand, by repeating the phase adaptation as soon as the monitored phase exceeds a particular value, and on the other hand, by adapting the frequency as described in point A). In addition, there is a combination of these two possibilities. Since, in the method described in point A, the frequency adjustment typically takes place one cycle later than a corresponding change in frequency in the master bus, an accumulation of a difference may even result when the frequencies of the buses involved are very persuasively matched. In this case, a minor phase adjustment or compensation must occasionally be accomplished by a targeted, in particular predefined frequency which does not exactly match.

Use of the corresponding TTCAN interface may be demonstrated by a debugging instrument. The performance on the bus may also be analyzed by bus monitoring.

A general method of synchronization is now described below, showing how two or more TTCAN buses may mutually synchronize their cycle times. Here again, this method may be implemented by dedicated hardware, by the application running on the corresponding hosts, or by a special software layer.

The sequence of the method, including possible variants, is described below; the same prerequisites and definitions apply as was the case in synchronization of the global time, i.e. direct synchronizability when there is at least one gateway computer having access to both buses, and there is a chain of gateways between two buses to be synchronized, connecting the two buses via directly synchronizable, coupled pairs. Here again, the synchronization is performed by a synchronization layer in hardware or software, which performs the synchronization and is referred to below as synchronization layer SLZ with respect to the cycle times. Here again, the SLZ need not necessarily be present at each node. First, the frequency adjustment between two buses will again be discussed here in point AZ).

AZ) Frequency Adjustment between Two Buses

A frequency adjustment is only possible in TTCAN level 2 via protocol mechanisms. However, it is sufficient if the time master is operated in level 2 operation. This is not necessary for other nodes. There, the adjustment proceeds there like the corresponding adjustment for the global time, as described above, and thus cannot be made independently of this adjustment if the global time is also synchronized in the same network.

In TTCAN level 2, the rate of the cycle time, i.e. the length of unit of time NTUZ is determined by the frequency of the timer, in particular the oscillator of the time master and its TUR value, as already described above for the global time. The SLZ must ensure that the NTUZ's have the specified ratios to one another on the different buses. In this context, the NTUZ's may be the same as or different from the NTU mentioned above.

In principle, different procedures are conceivable. Either one bus may be adjusted to the others or two or more mutually approach each other. In addition, the adjustment may in turn take place in one step or gradually. The particular strategy depends on the SLZ and the requirements of the application. In particular, the synchronization of the global time and synchronization of the cycle time may be performed by the same software layer, i.e. the same synchronization layer SL, which may be expressed as follows in an advantageous embodiment:

SL=SLZ.

All the methods regarding the frequency adjustment have the following scheme in common within the scope of the cycle time:

The SLZ determines the correction to be performed for a bus and notifies the current time master of it. The correction may be, for example, the ratio of the instantaneous TUR value and the new TUR value to be set.

It is, in turn, particularly advantageous if the SLZ determines the correction on the time master. Then, the correction value may be, for example, the new TUR value.

The SLZ determines the new TUR value in the time master and uses it as of the following cycle.

All the other nodes of this bus follow the time master via TTCAN synchronization.

This method may be explained again on the basis of FIG. 4, where the sequence is essentially the same, except that the cycle time is used instead of the global time. Therefore, reference is made here to the preceding discussions of FIG. 4, and details will not be explicitly described again.

ANOTHER EXAMPLE

There are two buses, B1 and B2. The synchronization strategy is that B2 must adjust the length of the NTUZ to the length valid on B1. In the simplest case, both are nominally the same length. The application (SLZ) of the current time master of B2 is assumed to have direct access to bus B1, and the same oscillator is to be used for B1 and B2. Then, the NTUZ's of the two buses B1 and B2 are exactly the same length when the TUR value of this node with respect to B1 is equal to the TUR value of this node with respect to B2. Therefore, the SLZ must use the TUR value with respect to B1 as the TUR value with respect to B2.

In principle, the situation may be handled in the same way, if the NTUZ's of the two buses have any desired ratio to one another. In hardware, it is again advantageous for the ratio or the reciprocal value to be an integer, in particular one that is squared. If the same timer, in particular oscillator, is not used for both buses, there is again the aforementioned possibility of measuring the difference in the global times of the two buses at least twice and/or periodically in succession, and calculating a correction factor from the comparison between the observed change in the difference and the nominal change in the difference. This possibility is also given again, if the current time master does not have access to both buses. As an alternative, the SLZ may measure the length of a basic cycle from one bus in units of the other bus and determine the correction value from this.

BZ) Phase Adjustment

The SLZ again measures the phase difference between two times on two buses and determines the jump, i.e. change, to be set for each of the two buses. The SLZ transmits the particular jump to be set to the two current time masters of the two buses.

A time master having to set a jump sets, in turn, a predefined bit, in this case, especially the Next_is_Gap bit of the TTCAN (see ISO Draft), in the reference message. From the local SLZ, it receives the starting time of the next basic cycle.

After this (these) reference message or messages is/are possibly successfully sent on the two buses, the cycle time phases of the two buses are synchronized.

This may again be represented by FIG. 5, as described above; the cycle time being used instead of the global time, and the Next_is_Gap bit being used. This desired phase may be 0 here, i.e. the basic cycle begins at the same time on both buses. However, this is by no means necessary. It is not necessary for the NTUZ's, i.e. the time units of the cycle time, to be the same on the buses to be synchronized. However, it is particularly simple and useful if the (nominal) NTUZ's between two coupled buses differ only by an integral factor, in particular powers of two, in an advantageous manner.

It is also not necessary for the cycle lengths of the buses to be synchronized to be the same. However the method proposed here is particularly beneficial when the (nominal) cycle lengths of the two buses are in a rational ratio to one another which does not use excessively large natural numbers, because then it is regularly possible to speak of a fixed phase in an easily reproducible manner. Example: Two (nominal) cycles are running on one bus B1, while three are running on another bus B2. Then, a theoretically fixed phase relation between B1 and B2 is present every other cycle on B1 (every third cycle on B2).

In the case of more than two buses, it is particularly advantageous if, with such a paired synchronization of two buses, the jump only takes place on one of the two buses, i.e. one of the two buses assumes a master role for the phase of the cycle time. In other words, the sequence of basic cycles on the first bus remains unchanged, while a gap is inserted between two basic cycles on the second bus, the gap being just large enough to adjust the desired phase. In this case, more than two buses may easily be synchronized successively via the paired synchronization without the synchronization of a pair having a particularly complex influence on that of another pair.

EXAMPLE

There are five buses in the system, B1 through B5. Synchronizable pairs include (B1, B2), (B1, B3), (B2, B4), (B3, B5). If B1 is the master for B2 and B3, and B2 is the master for B4, and B3 is the master for B5, then the paired synchronization (B2 and B3 are first synchronized to B1, then B4 is synchronized to B2, and B5 is synchronized to B3) results in system-wide synchronization within two cycles.

In the same system, synchronization could also be performed without the master principle. Then, however, the SLZ must ensure that once buses are synchronized, they will remain synchronized, i.e. a jump or a correction on one bus will also take place on all buses synchronized with it.

In addition, it is advantageous (but not necessary) for the time master of a bus to be synchronized to also have direct access to the corresponding partner bus. In this case, the SLZ may only be set up for the potential time masters of one bus, i.e. the SLZ message regarding the level of the jump to be set is eliminated or becomes very simple.

CZ) Phase Adjustment by Frequency Shift

As a further alternative to the mechanism, this time the one in section BZ), it is also possible, here, to achieve a phase equalization by longer-term modification of the rate, as in point AZ). The basic procedure is exactly the same as that described in point AZ). However, the goal in this case is not to precisely adjust the NTUZ's of the bus to be adjusted to the target value there, but to slightly lengthen or shorten these NTUZ's, so that the clock to be adjusted is incremented slightly more slowly or more rapidly, and therefore, a phase adjustment is achieved over a longer period of time.

DZ) Preserving the Synchronized State

After a phase adjustment as in BZ) or CZ), there are various possibilities for maintaining the synchronized state, as already described in point D) of synchronization of the global time:

Repeating the phase adjustment as soon as the observed phase exceeds a certain value.
Adjusting the frequency as in AZ) or A) or a combination of the two possibilities.

In the method described in AZ) or A), the frequency adjustment is typically performed one cycle later than a corresponding frequency change in the master bus, so even when there is a very precise matching of the frequencies of the buses involved, this may result in an accumulation of a difference. In this case, a small phase adjustment or compensation must occasionally be performed, using a frequency which intentionally does not match exactly. As in synchronization of the global time, this use may be displayed by a debugging instrument, or performance on the bus may be analyzed with the aid of bus monitoring.

What is claimed is:

1. A method for synchronizing at least two TTCAN buses connected via at least one bus user, comprising:
    determining a global time in each of the at least two TTCAN buses;
    determining deviations in the global times of the at least two TTCAN buses from the global times;
    transmitting the deviations to the at least one bus user; and
    adjusting the global times to one another as a function of the deviations in the global times, so that the at least two TTCAN buses are synchronized with respect to the global times.

2. The method as recited in claim 1, further comprising:
    adjusting cycle times of the at least two TTCAN buses by adjusting at least one phase of the global times.

3. The method as recited in claim 1, further comprising:
    adjusting the global times by adjusting at least one frequency of the global times.

4. The method as recited in claim 2, wherein:
    the at least one phase is adjusted as a function of a value of at least one predefined bit.

5. The method as recited in claim 4, wherein:
    the at least one predefined bit corresponds to a discontinuity bit of TTCAN.

6. The method as recited in claim 3, further comprising:
    determining, in each instance, a smallest time unit in the at least two TTCAN buses for adjusting the at least one frequency;
    determining a ratio of the smallest time units to produce a resulting real ratio;
    comparing the resulting real ratio to a predefined ratio; and
    adjusting at least one of the smallest time units so that the predefined ratio is attained.

7. The method as recited in claim 6, wherein:
    the predefined ratio is an integer corresponding to one of a multiple of the number two and a submultiple of the number two.

8. A device for synchronizing at least two TTCAN buses linked together by at least one bus user, comprising:
    a first arrangement for:
        determining a global time in each of the at least two TTCAN buses,
        determining deviations in the global times of the at least two TTCAN buses from the global times, and
        transmitting the deviations to the at least one bus user; and
    a second arrangement for adjusting the global times to one another as a function of the deviations in the global times, so that the at least two TTCAN buses are synchronized with respect to the global times.

9. The device as recited in claim 8, further comprising:
    a synchronization layer included in the at least one user and in which are contained the first arrangement and the second arrangement.

10. A bus system, comprising:
    at least two data buses, a first data bus of the at least two data buses having a first number of users and a second data bus of the at least two data buses having a second number of users, wherein:

the at least two data buses include at least two TTCAN buses, at least one user of one of the first number of users and the second number of users corresponding to at least one connection user, such that two of the at least two TTCAN buses are simultaneously connected to the at least one connection user, and the at least one connection user performing a time-master function for each TTCAN bus being included, and if the bus system includes more than two TTCAN buses, the TTCAN buses are connected in such a manner that, in each instance, at least two of the TTCAN buses have at least one common connection user; and a synchronization arrangement for determining a global time in each TTCAN bus and transmitting deviations in individual global times to those of the first number of users and the second number of users having the time-master function for adjusting a specific, global time.

* * * * *